(12) United States Patent
Lee

(10) Patent No.: US 6,394,781 B1
(45) Date of Patent: May 28, 2002

(54) MOLDS ALTERABLE IN NUMBERS FOR INJECTING MOLDING MACHINES

(75) Inventor: Po-Chien Lee, Tainan (TW)

(73) Assignee: Golfang Mfg. & Development Co., Ltd., Tainan (TW)

( * ) Notice: Subject to any disclaimer, the term of this patent is extended or adjusted under 35 U.S.C. 154(b) by 0 days.

(21) Appl. No.: 09/553,741

(22) Filed: Apr. 20, 2000

(51) Int. Cl.⁷ .......................... B29C 49/06; B29C 49/36
(52) U.S. Cl. ..................... 425/190; 425/192 R; 425/533
(58) Field of Search ................................. 425/526, 529, 425/533, 534, 541, 572, 588, 190, 192 R

(56) References Cited

U.S. PATENT DOCUMENTS

| | | | | |
|---|---|---|---|---|
| 3,816,050 A | * | 6/1974 | Niemi ......................... | 425/525 |
| 3,838,961 A | * | 10/1974 | Yogosawa et al. .......... | 425/533 |
| 4,150,931 A | * | 4/1979 | Gabrys .................... | 425/192 R |
| 4,867,668 A | * | 9/1989 | Miyairi ................... | 425/192 R |
| 5,219,586 A | * | 6/1993 | Yukihiro et al. ............ | 425/190 |
| 6,171,094 B1 | * | 1/2001 | Von Holdt .................. | 425/190 |

* cited by examiner

Primary Examiner—Robert Davis
(74) Attorney, Agent, or Firm—Pro-Techtor International Services

(57) ABSTRACT

Molds alterable in numbers for injecting molding machines includes core molds, a core mold supporter, injecting hole molds, an injecting hole mold supporter, a bottle mold having bottle mold holes supported on a bottle mold supporter. The core mold supporter, the injecting hole mold and the bottle mold all have the same plural number of the core mold holes, the injecting holes and the bottle mold holes, which may be all used or one or two of them only used according to the number of bottles to be produced so as to speed up production and not to change all the related components in case of producing different diameter bottles. In addition, the components to be changed are quite a few and changing process is simple to save time and labor by inserting or removing them out of the holes in the mold supporters.

1 Claim, 5 Drawing Sheets

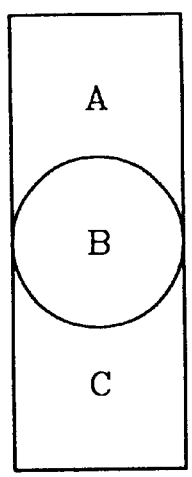
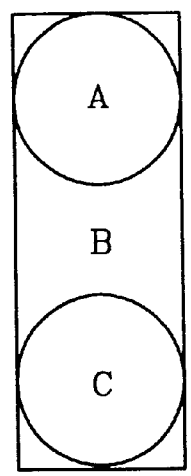
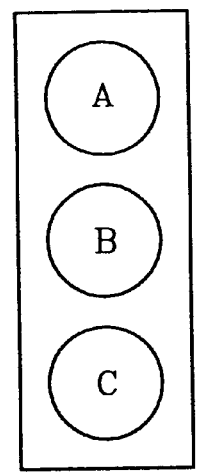
FIG. 7　　　　FIG. 8　　　　FIG. 9
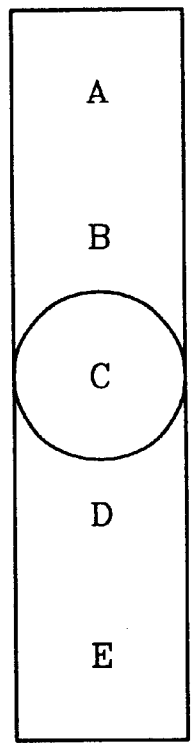
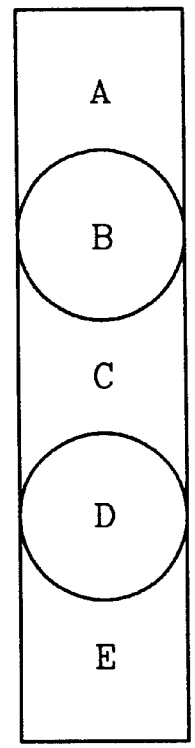
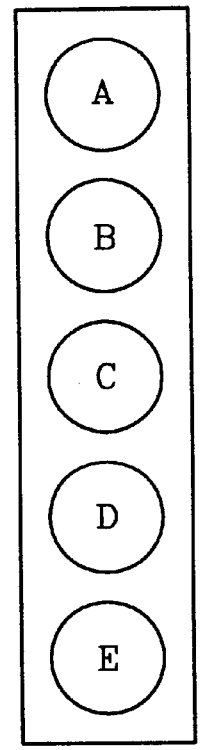
FIG. 10　　　FIG. 11　　　FIG. 12

MOLDS ALTERABLE IN NUMBERS FOR INJECTING MOLDING MACHINES

BACKGROUND OF THE INVENTION

This invention relates to molds alterable in numbers for injecting molding machines, particularly to a machine having a plurality of mold supporters for fixing molds therein, and the number of mold holes alterable according to necessity for making use of the largest injecting capacity of an injecting,molding machine, thereby breaking through the drawback of traditional mold supporters provided with only a single mold hole. The molds are installed in the mold supporter by an inserting mode so as to shorten the time needed in changing molds and to reduce cost as much as possible.

Common injecting molding machines for making bottles always operates with a single mold supporter for a single core mold, injecting one bottle material unit to the core mold, which is with the material then rotated for 180 degrees and fits in a bottle mold for blowing a bottle shaped in the bottle mold, not possible to quicken production of bottles limited by the single mold. In addition, in case that bottles of different sizes are to be made, all of the core mold supporter, the core mold, the injecting mold supporter, the bottle mold supporter and the bottle mold should be changed, very troublesome and time-wasting.

SUMMARY OF THE INVENTION

The purpose of the invention is to offer molds alterable in numbers to be combined in a mold supporter for injecting molding machines chiefly producing plastic bottles, with the molds easily changeable and possible to produce in a large, a medium or a small quantity so as to lessen mold cost.

The feature of the invention is a core mold supporter, which has two sides provided with a plurality of mold holes for receiving independent core molds and micro adjusters respectively combined with each core mold in each core mold hole. And an injecting mold supporter also has the same number of injecting mold holes for injecting molds as the core mold holes, so does the bottle mold supporter have the same number of bottle mold holes for bottle molds to coordinate with the core molds. Then if bottles of different size is to be made, then the injecting molds and the bottle molds are necessary to be altered, with the core molds with the micro adjusters, the core mold supporter and the injecting mold supporter remained the same, unnecessary to change.

BRIEF DESCRIPTION OF DRAWINGS

This invention will be better understood by referring to the accompanying drawings, wherein:

FIG. 7 is a graphic view of one of three mold holes used in the core mold supporter, the injecting mold supporter and the bottle mold supporter in the present invention; and, FIG. 8 is a graphic view of two of the three mold holes used in the core mold supporter, the injecting mold supporter and the bottle mold supporter in the present invention;

FIG. 9 is a graphic view of three of the three mold holes used in the core mold supporter, the injecting mold supporter and the bottle mold supporter in the present invention;

FIG. 10 is a graphic view of one of five mold holes used in the core mold supporter, the injecting mold supporter and the bottle mold supporter in the present invention;

FIG. 11 is a graphic view of two of the five mold holes used in the core mold supporter, the injecting mold supporter and the bottle mold supporter in the present invention; and, FIG. 12 is a graphic view of five of the five mold holes used in the core mold supporter, the injecting mold supporter and the bottle mold supporter in the present invention.

DETAILED DESCRIPTION OF THE PREFERRED EMBODIMENT

Figure 1:
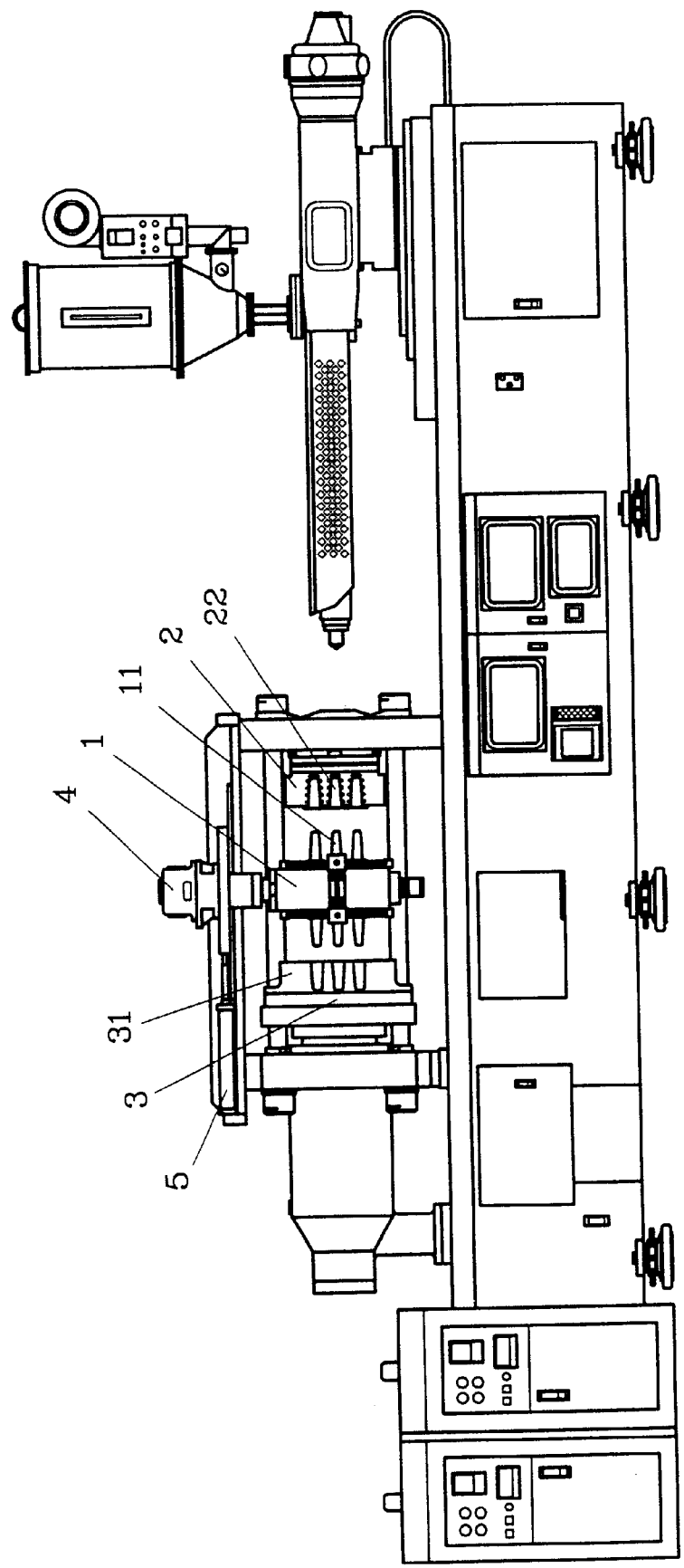
FIG. 1 is a side view of molds alterable in numbers for an injecting molding machine in the present invention.

A preferred embodiment of molds alterable in numbers for injecting molding machines, chiefly for producing plastic bottles, as shown in Fig. include a core mold supporter 1 installed in an intermediate portion of an injecting molding machine, provided with a plurality of core mold holes 12 respectively formed in two sides for inserting a micro adjuster 13 together with a core molds 11 therein, and an injecting mold supporter 2 provided with the same number of injecting mold holes 21 as the core molds 11 for inserting injecting molds therein, and a bottle mold supporter 3 supporting a bottle mold 31 consisting of a left and a right side mold having a plurality of mold holes 32 for shaping bottles therein as the core molds 11. Each bottle mold hole 31 has a bottle bottom mold 32 separable from the bottle mold hole 31.

Further, a rotatable base 4 is provided, connected with the core mold supporter 1 with a support frame, and rotated with a pressure cylinder 5, rotating the core mold supporter 1 at the same time through 180 degrees to change its position from facing the injecting mold supporter 2 to facing the bottle mold 31. When the core mold supporter 1 faces the injecting mold supporter 2, plastic material is injected around each core mold 11 by each injecting mold 22. After that, the core mold supporter 1 is rotated together with the rotatable base 4 to face the bottle mold 31. Then the bottle mold 31 is moved to the core mold supporter 1, with each core mold 11 together with plastic material protruding in each bottle mold 31. Then the plastic material is blown to shape a bottle in each bottle mold hole 32, and cooled to fall out of the bottle mold 31.

Figure 3:
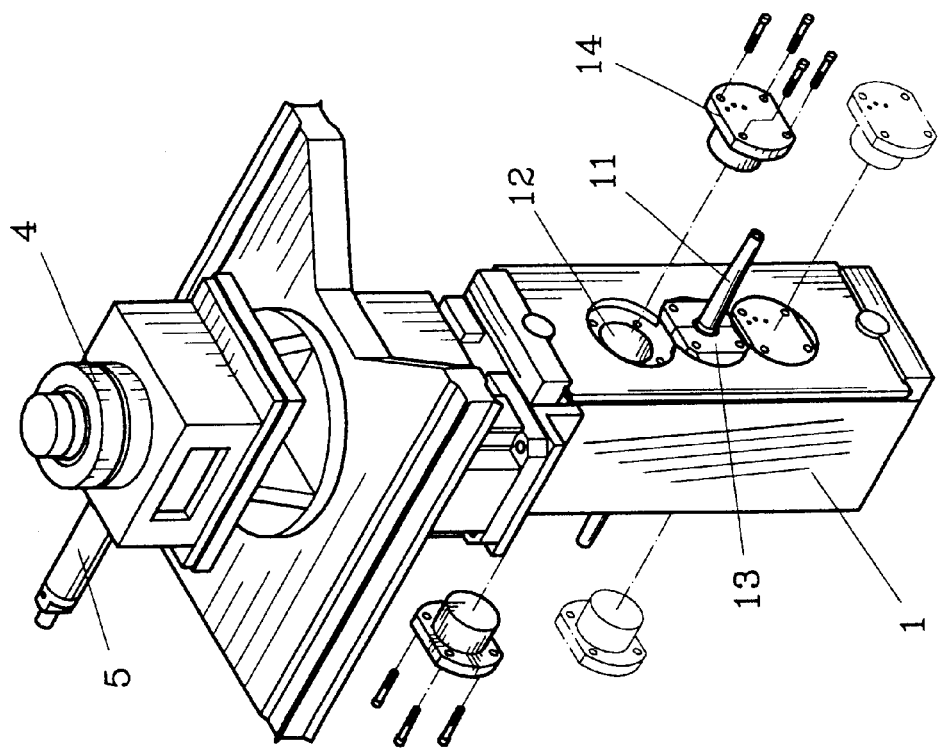
FIG. 3 is a perspective view of the core mold removed from one core mold hole of the core mold supporter and a cap being closed in the core mold hole unused in the present invention.
Figure 2:
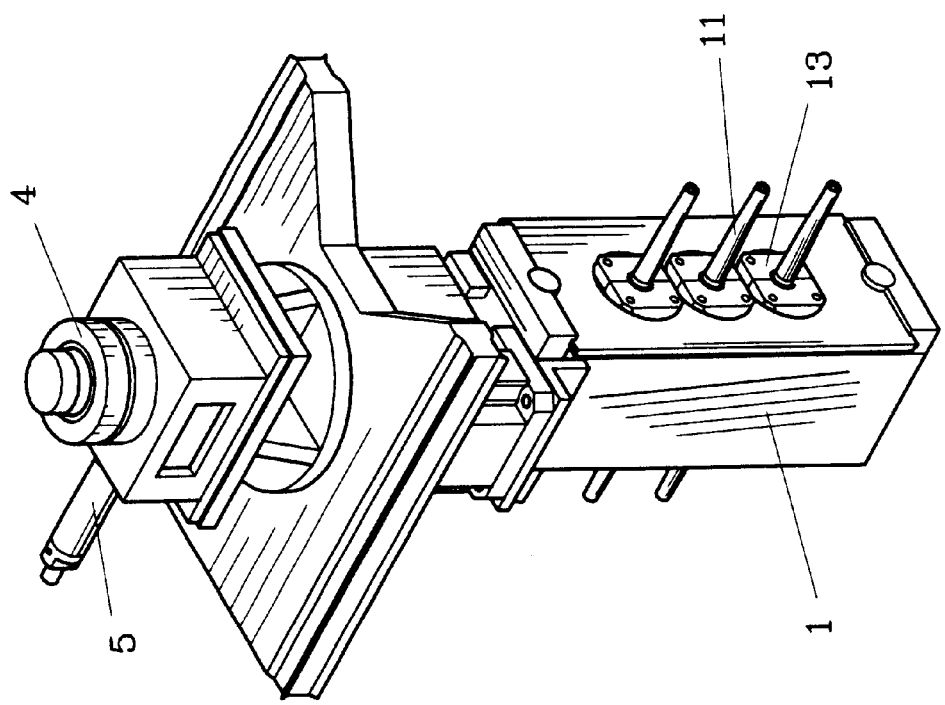
FIG. 2 is a perspective view of a core mold supporter in the present invention.

As shown in FIGS. 2 and 3, each core mold 11 is held with the independent micro adjuster 13 and then inserted removably in each core mold hole 12. So if only one core mold in the core mold supporter 1 is used for molding, the rest core molds are removed from the core mold holes 12 and a cap 14 is respectively closed in each empty core mold holes 12.

Figure 4:
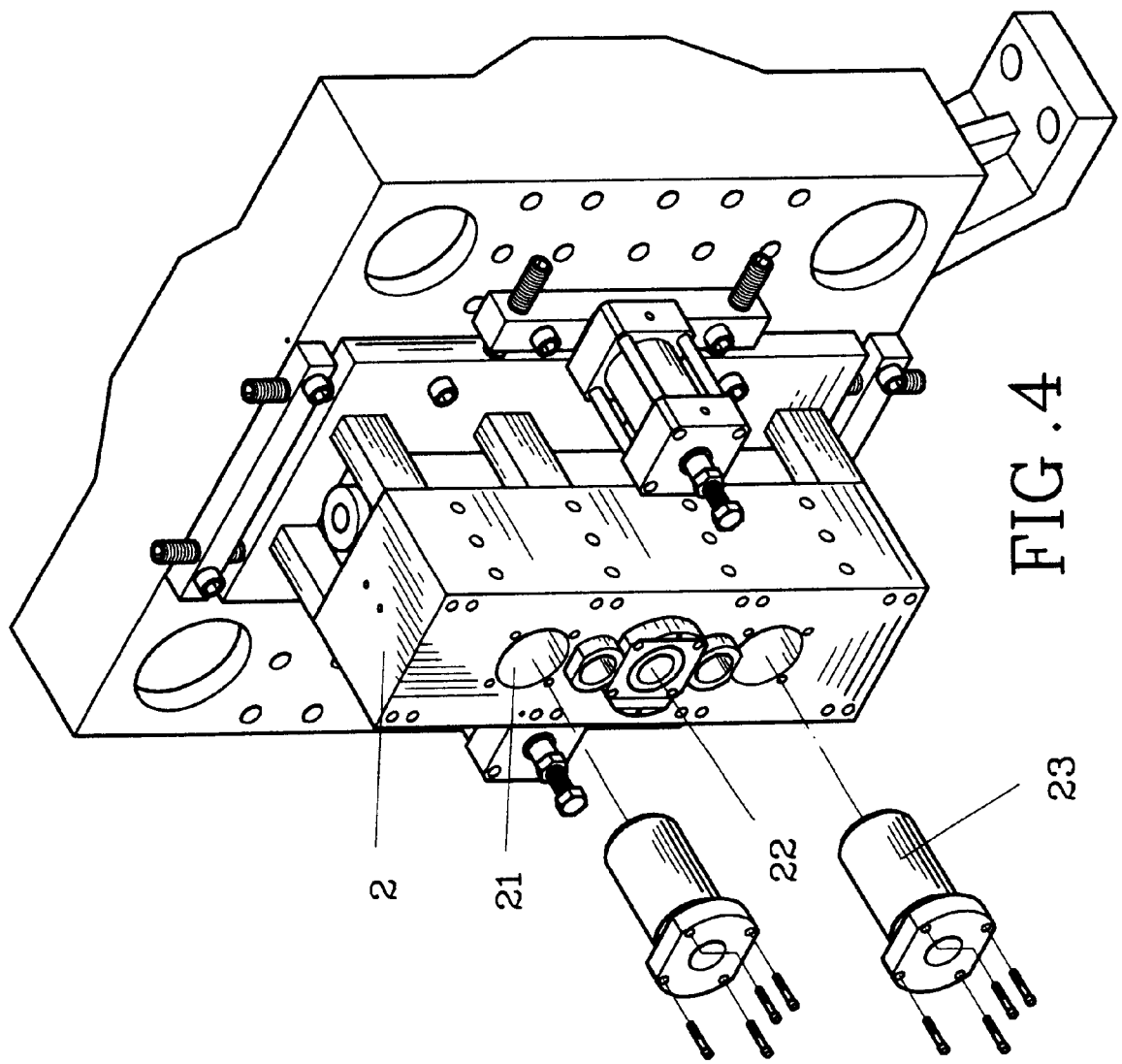
FIG. 4 is a perspective view of injecting molds removed from the injecting mold holes in a injecting mold supporter and cap being closed in the injecting mold holes unused in the present invention.

Next, as shown in FIG. 4, the injecting molds 22 are also inserted removably in the injecting mold holes 21 in the injecting mold supporter 2. When only one of the injecting mold is used, the rest injecting molds 23 are removed from the injecting mold holes 21, and a cap 23 is inserted instead to close up each empty injecting mold hole 21.

Figure 6:
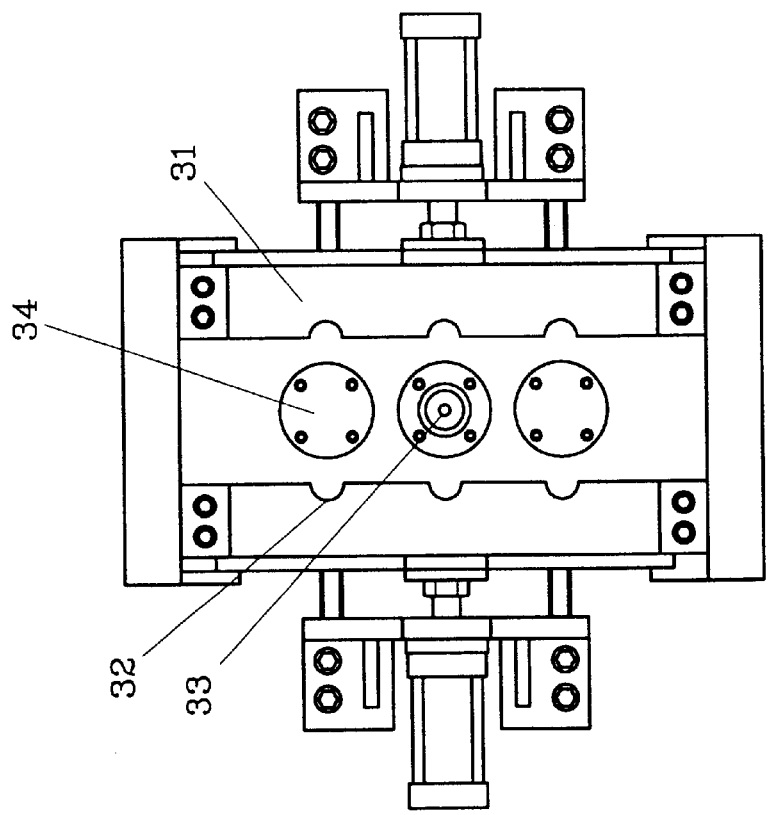
FIG. 6 is a front view of the bottle mold supporter with the bottle mold holes closed with caps in the present invention.
Figure 5:
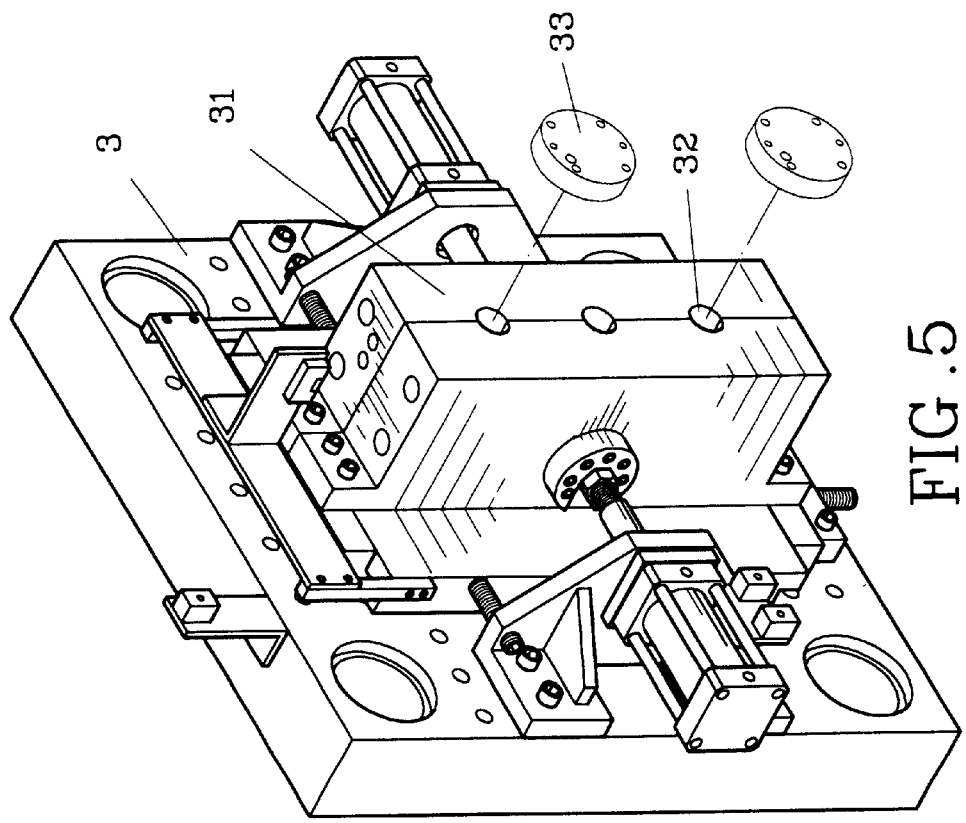
FIG. 5 a rear perspective view of a bottle mold supporter with bottle bottom molds removed from bottle mold holes unused in the present invention.

As for the bottle mold 31 with bottle mold holes 32, as shown in FIGS. 5 and 6, it consists of a left and a right side molds possible to move together or separate from each other. When only of the bottle mold hole 32 is used, then two of the bottle bottom molds 33 are removed and caps 33 are closed in the empty bottom holes.

The number of the core mold holes 12, the injecting mold holes 21 and the bottle mold holes 32 may be three or five, or any.

When bottles of different diameters and numbers are produced in a large, a medium or a small quantity, the core mold holes 12, the injecting mold holes 21, and the bottle mold holes 32 to be used may be adjusted in numbers according to necessity.

For example, as shown in FIGS. 7, 8 and 9, in the core mold supporter 1, if one mold hole B is used for molding, the other two mold holes A and C are closed with the caps 14. This mode is applied to production of bottles of larger diameter than two mold holes used, rather suitable to a small quantity. If two mold holes A and C are used for production of bottles of larger diameter than three mold holes used, rather suitable for a medium quantity. 3. If three mold holes A, B and C are all used for production of bottles of small diameter, it is suitable for a large quantity.

As for the five mold hole supporter, 1. if one hole C is only used for production of a larger diameter than two mold holes used, it is suitable for a small quantity and saving mold cost. If two mold holes B and D are used for production of a larger diameter than five mold holes used, it is suitable for a medium quantity, 3. If five mold holes A, B, C, D, and E are all used for production of a small diameter, it is suitable for a large quantity.

In producing different diameter bottles, the injecting hole molds 22 and the bottle bottom molds 33 are needed to change, and the rest such as the core molds 11, the micro adjuster 13, the bottle mold 31, the core mold supporter 1, the injecting mold 2, the bottle mold 31 are not necessary to change. Then the cost for these can be saved in producing different size bottles.

While the preferred embodiment of the invention has been described above, it will be recognized and understood that various modifications may be made therein and the appended claims are intended to cover all such modifications which may fall within the spirit and scope of the invention.

What is claimed is:

1. An injecting molding machine with a variable number of molds comprising:

a plurality of core molds inserted removably in a core mold supporter installed in an intermediate portion of said injecting molding machine, a plurality of injecting hole molds in a number equal to that of said core molds inserted removably in injecting hole mold holes in an injecting hole mold supporter, a bottle mold with a plurality of bottle mold holes in a number equal to that of said core molds supported in a bottle mold supporter, each said bottle mold hole being closed with a bottle bottom mold; wherein said core mold supporter is connected to a rotatable base supported on a support frame, a pressure cylinder is operated to rotate said rotatable base together with said core mold supporter through 180 degrees to change a position of said core mold supporter from facing said injecting mold supporter to facing said bottle mold after plastic material has been injected around said core molds, and said core molds are moved to be received in said bottle molds for blowing the plastic material into a bottle shaped in said bottle molds; and wherein said core mold supporter has two sides provided with core mold holes in a number equal to that of said core molds to removably receive said core molds, an independent micro adjusting base is fixed to each said core mold and inserted removably in said core mold holes of said core mold supporter, each said core mold and corresponding said micro adjusting base being replaced with a core mold cap when said core mold is not used for molding, each said injecting hole mold being replaced with an injecting hole mold cap when said injecting hole mold is not used for molding, and each said bottle mold hole being replaced with a bottle mold hole cap when said bottle mold hole is not used for molding; such that said core mold supporter, said injecting hole mold supporter, and said bottle mold supporter do not need to be changed to produce different sizes of bottles, rather only said injecting hole molds and said bottle bottom molds need to be replaced to produce different sizes of bottles.

* * * * *